Dec. 22, 1959   F. J. HENDERSON ET AL   2,918,020
DRIVE UNIT CONSTRUCTIONS FOR CONVEYOR CHAINS
Filed Feb. 23, 1954   6 Sheets-Sheet 1
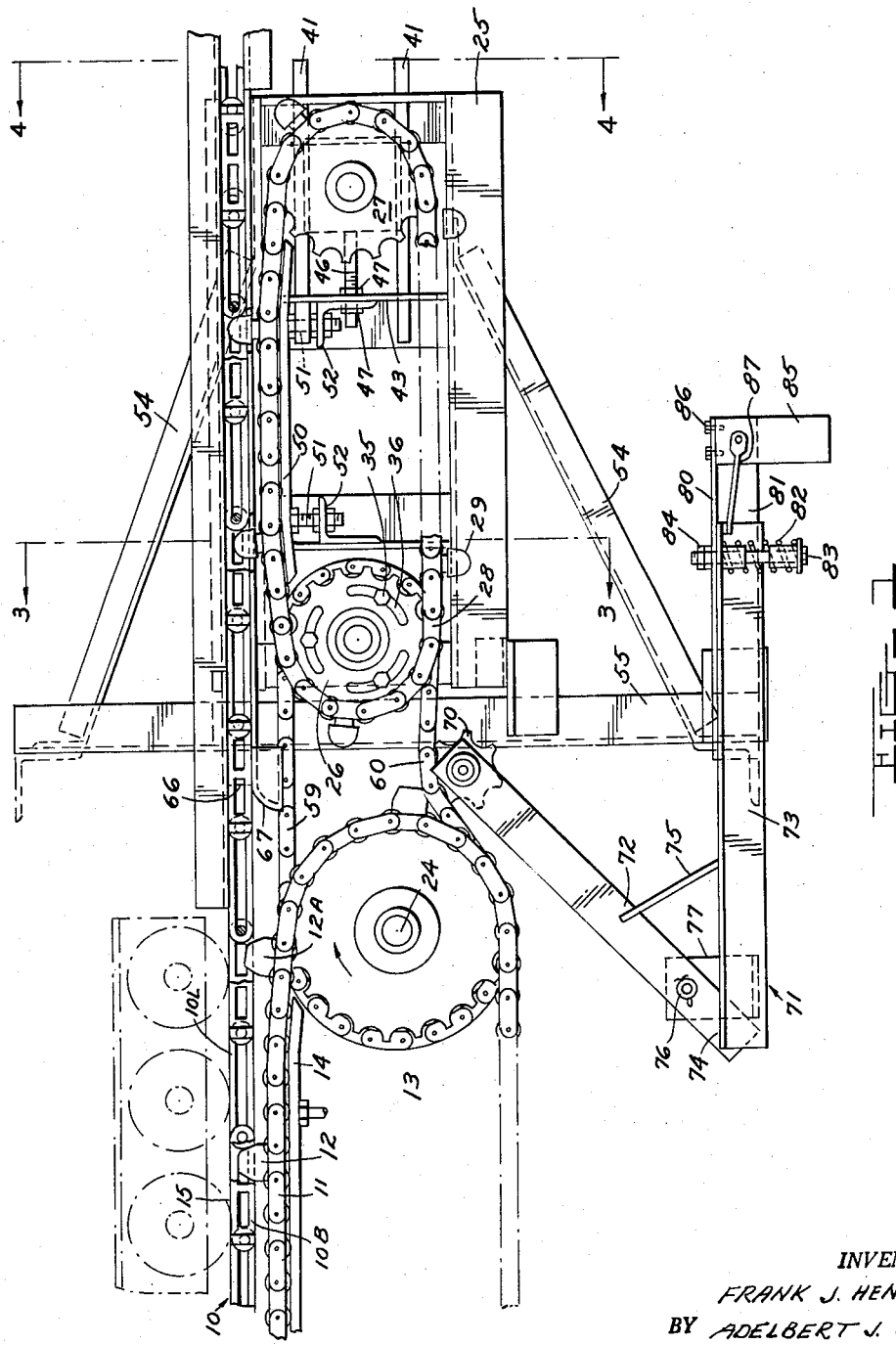
INVENTORS
FRANK J. HENDERSON
BY ADELBERT J. SCHENK
Farley Forster Harley
ATTORNEYS

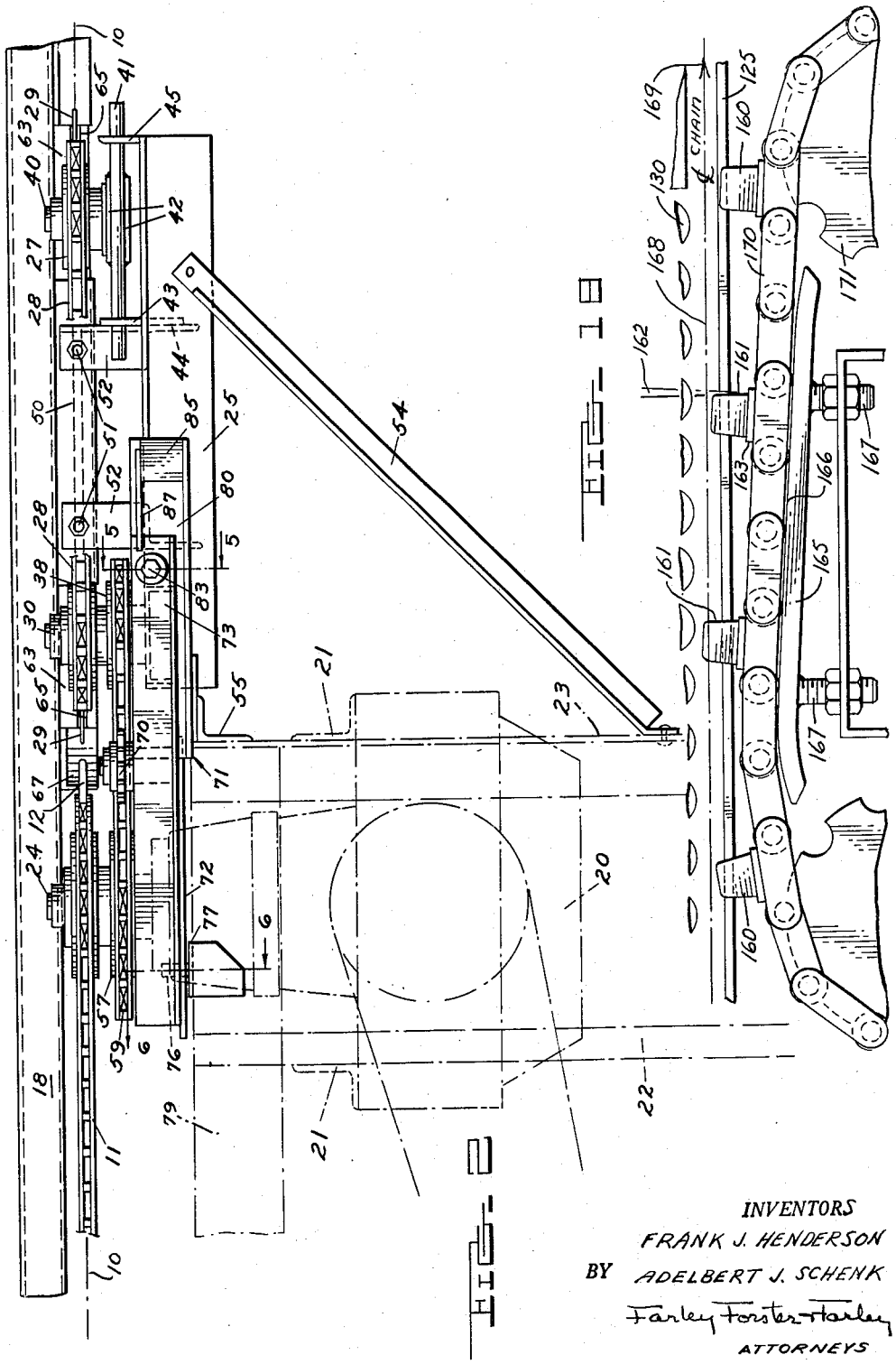

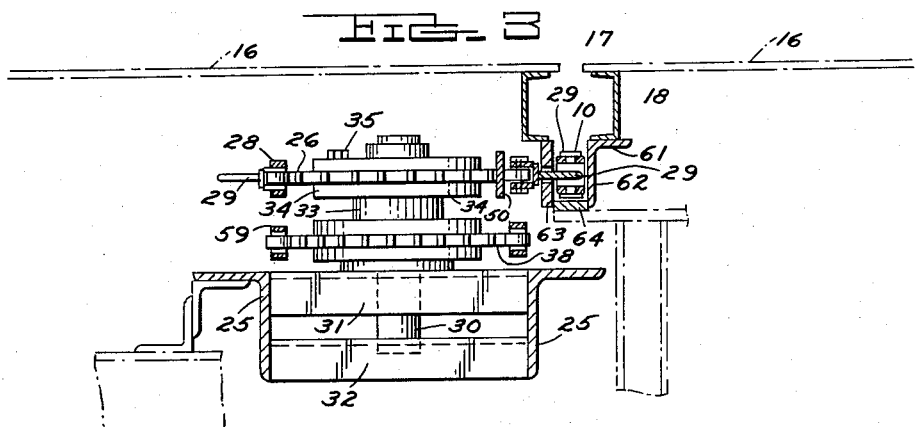
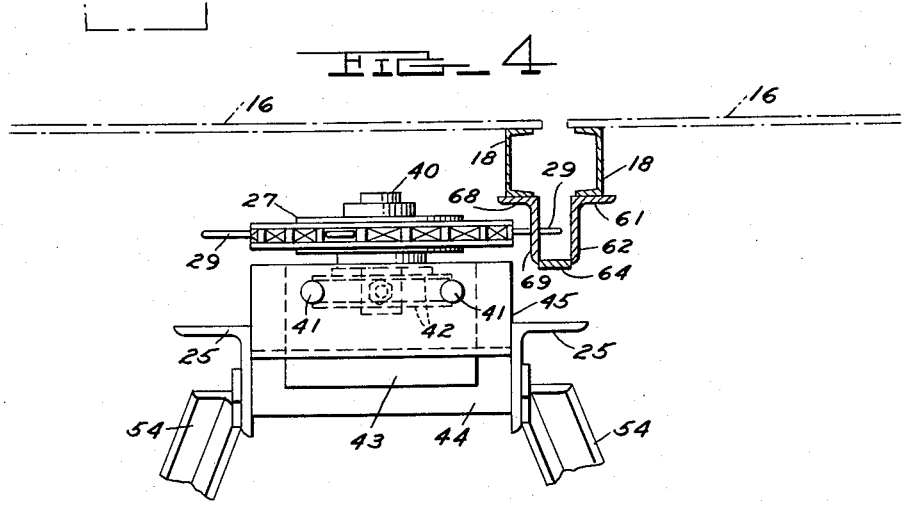
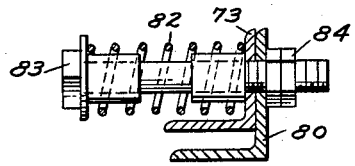
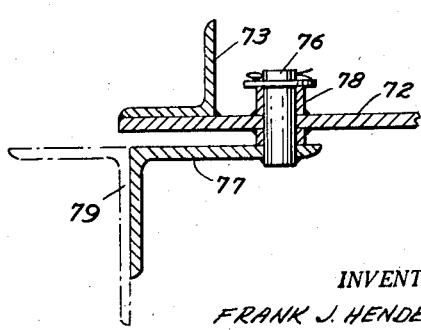

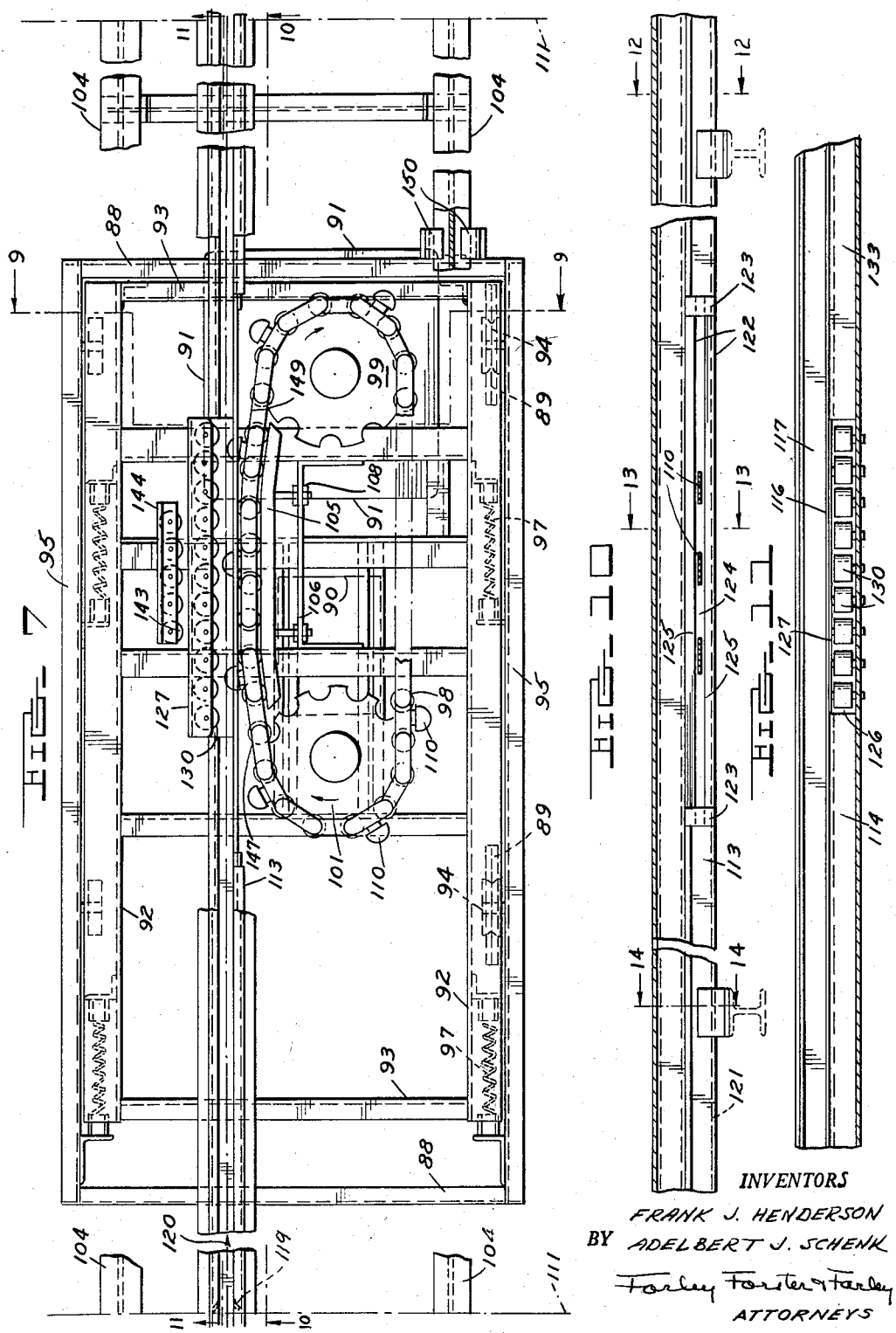

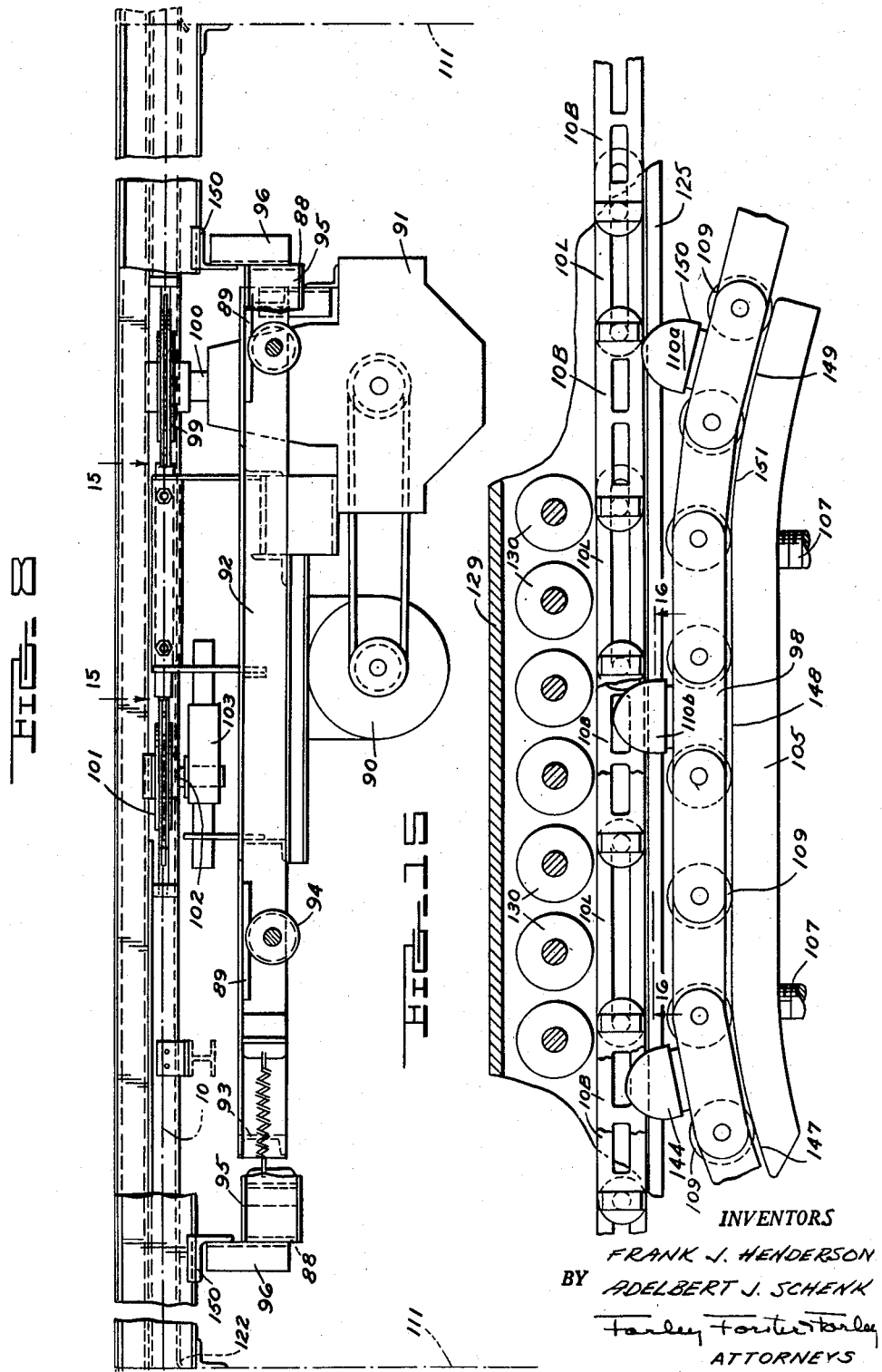

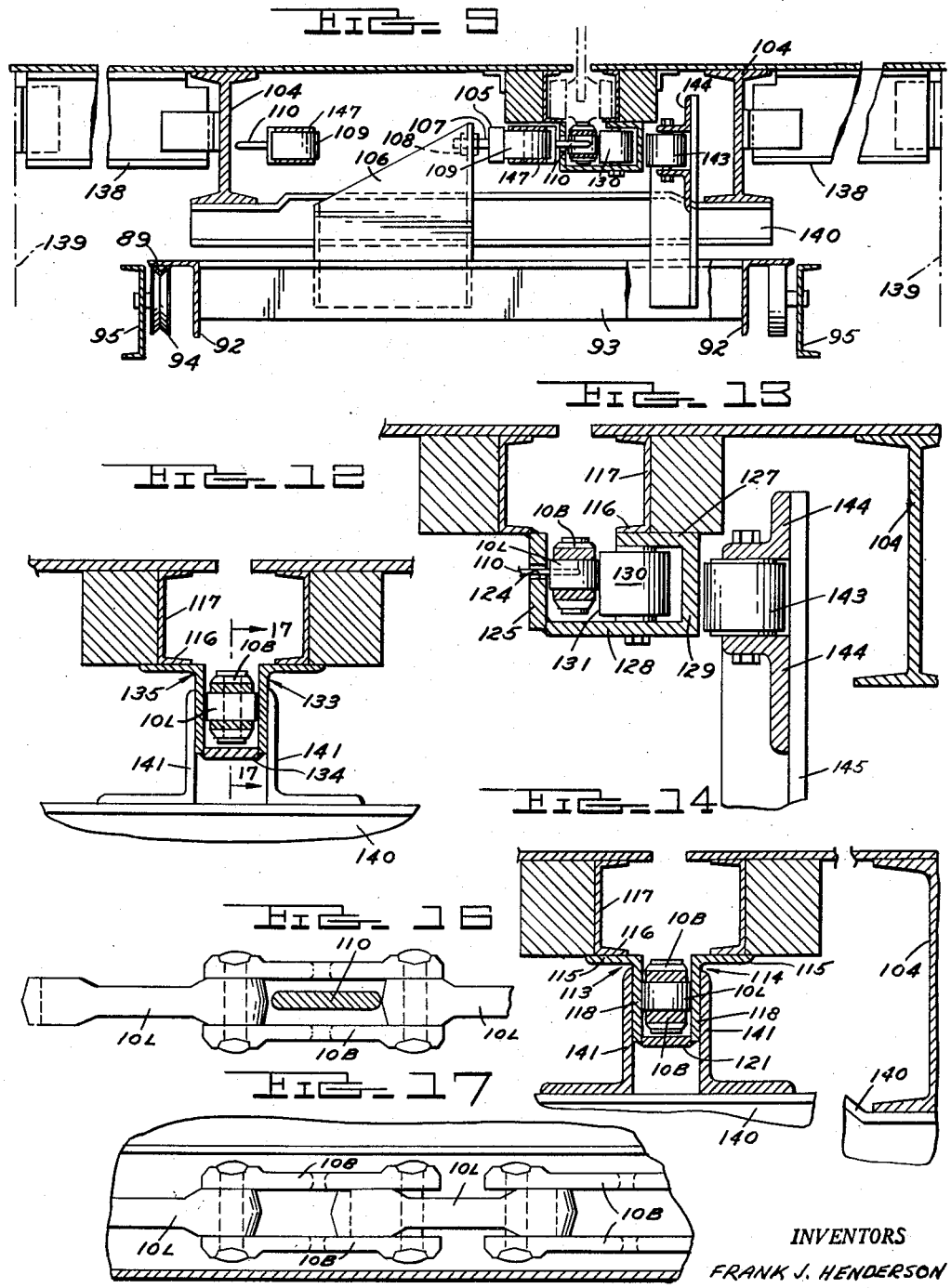

United States Patent Office 2,918,020
Patented Dec. 22, 1959

2,918,020

DRIVE UNIT CONSTRUCTIONS FOR CONVEYOR CHAINS

Frank J. Henderson, Detroit, and Adelbert J. Schenk, Huntington Woods, Mich., assignors to Jervis B. Webb Company, Detroit, Mich., a corporation of Michigan Application February 23, 1954, Serial No. 411,838

9 Claims. (Cl. 104—172)

This invention relates to the handling of slack chain in a conveyor installation, and includes improvements in the construction of a driving unit which contribute to a more simplified structure for accommodating the presence of slack in the conveyor chain.

Practically all conveyor installations require the provision of some means for compensating for changes in length of the conveyor chain, and the means most frequently employed for this purpose is a take-up device which provides a variable-length path of travel for the chain, usually around a 180° loop. Such a take-up device includes a movable track section for supporting the trolleys which carry the chain, this track section being mounted in a framework in alignment with stationary tracks for telescoping movement relative thereto, and normally urged by springs or counterweights to extend the path of travel of the conveyor. The path of travel of the conveyor usually goes through a 180° change of direction in passing around such a take-up. The installation of a take-up of this type very frequently complicates a conveyor system. It requires additional space and additional structure, and hence is not always desirable, entirely apart from cost considerations. Such a take-up does, however, perform at least two other important functions as part of its operation of compensating for changes in length of the conveyor chain. It acts to maintain a constant spacing between carrier elements of the conveyor, and establishes a minimum value of tension in the conveyor chain which serves to pull the chain free of engagement with the teeth of the chain driving element. Without this tension, or in other words, with slack present, the friction between the chain and the teeth of the driving member can cause the chain to tend to wrap around or follow the path of the teeth, causing a jam with possible damage to one of the components, at the discharge end of the drive unit.

The present invention offers a much simplified arrangement for handling slack chain in any installation where the maintenance of constant spacing between successive carriers is not a critical factor. A typical example of such an installation is a subfloor drive line of the type shown in U.S. Patent No. 2,621,609, where a trolley supported chain is positioned beneath floor level for propelling floor supported trucks in a path defined by a guide slot. The trucks are equipped with vertically movable drive pins which are engaged by propelling members on the trolleys when lowered through the guide slot. An extensible type of take-up is particularly cumbersome, costly and undesirable in an installation of this kind. However, it is to be understood that the present invention is not confined to installations of this particular type but can be applied to other installations employing conventional conveyor chain and where the above-mentioned factor of carrier spacing is not critical.

By conventional conveyor chain is meant a chain of alternate center links connected by pins to a pair of side bars and where a telescoping movement is permissible between center links and side bars in a longitudinal direction.

In the present invention, means are employed at, or in association with the driving unit for disengaging the chain from the driving members and thus preventing wrap-around. In conjunction with these means, a special chain channel is provided immediately following the driving unit where the chain is positively confined in longitudinal alignment so that slack can be permitted to accumulate in this channel through telescoping action between the chain links.

The accompanying drawings show presently preferred constructional examples of the invention which will be more fully described with reference thereto.

These drawings comprise the following views:

Fig. 1 is a plan view of a construction where the invention has been applied to a conventional or existing type of driving unit. Since the drive unit is of standard form, it has been shown only to the extent necessary to establish its relationship with the other components.

Fig. 2 is an elevation of the construction shown in Fig. 1.

Fig. 3 is a sectional elevation taken along the line 3—3 of Fig. 1, and Fig. 4 is a sectional elevation taken along line 4—4 thereof.

Fig. 5 is an enlarged sectional detail taken along the line 5—5 of Fig. 2, and Fig. 6 is an enlarged sectional detail taken along the line 6—6 thereof.

Fig. 7 is a plan view of a second type of construction where the chain-handling concepts of the invention have been incorporated in a main driving unit.

Fig. 8 is a side elevation of the drive unit shown in Fig. 7.

Fig. 9 is a cross-sectional elevation through this drive unit on the line 9—9 of Fig. 7.

Figs. 10 and 11 are fragmentary side elevations taken along the lines 10—10 and 11—11, respectively, of Fig. 7.

Figs. 12, 13 and 14 are sectional elevations of the conveyor track section at various points along the drive unit as indicated by the lines 12—12, 13—13 and 14—14 of Fig. 10.

Fig. 15 is a plan view taken along the line 15—15 of Fig. 8 showing the relation between the driving dogs and the conveyor chain on an enlarged scale.

Fig. 16 is an elevation taken along the line 16—16 of Fig. 15 and shows the engagement between a driving dog and the conveyor chain.

Fig. 17 is a sectional elevation taken along the line 17—17 of Fig. 12 and illustrates the telescoping action of the chain resulting from the presence of slack.

Fig. 18 is a plan view, similar to Fig. 15, showing an alternate arrangement of the drive chain, back up bar and drive dogs of a drive unit.

Referring to the construction appearing in Fig. 1, a conveyor chain 10 is propelled in a left to right direction by a conventional caterpillar type of driving unit. Only the discharge end of this unit is shown, the showing including a roller type of driving chain 11, which is equipped with spaced driving dogs 12, and which is trained about a sprocket 13. On the driving run of the roller chain 11, its path of travel is defined by a back-up bar 14 which serves to move the driving dogs 12 laterally into engagement with the end of center links 10L of the conveyor chain 10 in the spaces between the alternate pairs of side bars 10B thereof. The chain 10 is held in engagement with the driving dogs by a series of back-up rollers 15.

Such a driving unit pulls the conveyor chain 10 around its path of travel, placing the chain preceding the driving unit under tension. If any slack is present in the chain, it will ordinarily appear immediately following or on the discharge side of the driving unit, and any wrap-around between the chain and the drive will occur where the path of the conveyor chain 10 and the driving chain 11 diverge and the latter passes around the sprocket 13. Friction tends to prevent the conveyor chain disengaging from the driving dog 12A. If slack is present, the chain 10 will be pulled laterally from its normal path as the dog 12A travels on around the sprocket 13, to the extent that the amount of slack permits. A conventional type of take-up device can be adjusted to place the chain under sufficient tension at the discharge side of the drive unit to give proper disengagement between the drive dogs and the chain and prevent any wrap-around.

In the construction under discussion, such tension is imparted to the chain by entirely different means, and slack is handled in an entirely different manner.

These means may be generally described as an auxiliary chain propelling unit, which, in the construction shown, is in many respects a caterpillar type of driving unit in miniature. This auxiliary chain propelling unit is connected with and driven from the main driving unit.

Before describing its construction in detail, reference is made to Figs. 2 and 3 for a brief explanation of the type of conveyor shown and the relationship of the driving unit therewith. As previously mentioned, the conveyor installation shown is that of a subfloor drive line such as is employed for propelling wheeled floor trucks, and the driving unit is located in a pit formed beneath floor level. Referring to Fig. 3, floor plates covering the pit are indicated in phantom and designated generally by the reference 16. These plates are separated by a guide slot 17 which receives a drive pin carried by one of the floor trucks. Conveyor tracks 18, of channel section, are located below and at either side of the guide slot 17 and support wheeled trolleys (not shown). The conveyor chain 10 is connected to and suspended from the trolleys supported by the tracks 18. Structural members for supporting the floor plates and tracks 18 have not been shown for the sake of clarity. Many conveyor installations of this type have been made and are in use, and therefore construction details of this nature are well known. This same comment applies to the structure for supporting the main drive unit, although in Fig. 2, a phantom showing has been included of a few of the structural components. These components include a reducer 20, or gear box, supported from framework including a pair of transverse angle members 21 which in turn are connected between pairs of upright members 22 and 23 whose lower ends extend to the floor of the pit. All framework for the drive unit is supported upon the floor of the pit in the conventional manner. The sprocket 13, which is the driving sprocket of the main drive unit, is mounted on the output shaft 24 of the reducer 20.

The auxiliary chain propelling unit is built up on its own framework which includes two main longitudinal members 25, interconnected by suitable cross members for mounting a pair of sprockets 26 and 27. A roller chain 28 equipped with drive dogs 29 is trained about these two sprockets. Sprocket 26 can conveniently be considered the driving sprocket of the pair, and sprocket 27 the idler or tensioning sprocket.

Referring to Fig. 3, driving sprocket 26 rotates on an axis defined by an axle 30 which is carried by a pair of vertically spaced cross members 31 and 32 secured between the frame members 25. A hub is rotatably mounted upon the axle 30, and is provided with a flange 34 to which the sprocket 26 is adjustably connected by bolts 35 engaging arcuate slots 36 in the sprocket face. A second or input sprocket 38 is secured to the hub 33 below the sprocket 26.

Tensioning sprocket 27 rotates on an axle 40 (Figs. 2 and 4) which is supported by a slidably mounted carriage. This carriage consists in a pair of parallel bars 41, connected by a pair of transverse plates 42 to which the axle is secured. The parallel bars 41 are slidably carried between a pair of frame members (Fig. 2), one a vertical plate 43 which in turn is secured to an angle section frame cross member 44, and the other formed by a vertical flange of an angle section frame cross member 45. An adjusting screw 46 (Fig. 1) is secured to the plates 42 of the sliding carriage approximately midway between the pair of parallel bars 41 and projects through a hole formed in the vertical member 43. Adjusting nuts 47 secure the screw 46 to the vertical member 43 to define the position of the sliding carriage.

A back-up bar 50 is employed to define the lateral position of the chain 28 on its driving run, this back-up being secured by adjusting screws 51 to brackets 52 carried by the framework.

The auxiliary unit is rigidly secured to the framework of the main drive unit, such as by the angle braces 54 seen in Figs. 1, 2 and 4, and by attachment to a main frame member such as the angle section cross member 55 (Fig. 2). This mounting, as can be seen in Fig. 2, places the chain 28 of the auxiliary unit in substantially the same horizontal plane as that of the drive chain 11 of the main drive unit. A second sprocket 57 is mounted on the output shaft of the reducer 20, this sprocket 57 being located vertically in substantially the same plane as that of the input sprocket 38 of the auxiliary unit. A chain 59 connects sprockets 57 and 38 so that the chains of both main and auxiliary units move in unison.

The function of the auxiliary unit is that of controlling the location of any slack in the conveyor chain 10, and to insure that any such slack cannot be present or accumulate at the discharge end of the main drive unit. In other words, this function may be stated as that of positively drawing the conveyor chain 10 away from the discharge end of the main drive unit so that tension rather than slack will be present in the chain at that point to an extent sufficient to strip the chain from the drive dogs 12 of the main unit. It is only necessary for the auxiliary unit to absorb a very minor portion of the total load of conveyor in order to satisfactorily perform this function and therefore the amount of frictional engagement between the dogs of the auxiliary unit and the chain is materially less than at the main drive unit.

A special chain channel is employed in conjunction with the auxiliary driving unit, and this chain channel may be conveniently considered as being composed of two sections. The first of these sections functions to isolate the chain from the auxiliary driving unit, as well as to positively position the chain with respect to the driving dogs thereof. This section begins in advance of the area where the chain is initially engaged by the dogs of the auxiliary driving unit, and ends where such engagement ceases.

The second section of the chain channel immediately follows, and is provided for the purpose of allowing slack to accumulate through telescoping action between the side bars 10B and center links 10L of the chain as illustrated in Figs. 1 and 17. When so telescoped, conventional conveyor chain can easily become disassembled if the side bars 10B can move from the position where they straddle the thickened end portions of the center link 10. This cannot take place if the chain is kept in a substantially straight-line position, and hence the second section functions to maintain such a straight-line relationship so that the chain components cannot become disengaged when telescoped due to slack. The construction of the two sections of the chain channel are shown best in Figs. 3 and 4.

Referring to Fig. 3, the channel is located immediately below the tracks 18 and consists of an angle member 61, whose vertical flange 62 serves to confine the chain against lateral movement out of engagement with the drive dogs 29, a vertically extending barrier member or plate 63 interposed between the path of travel of the conveyor chain 10 and the auxiliary driving unit chain 28, and a bottom plate 64 which is connected to the barrier plate 63 and to the vertical flange 62. The barrier member 63 is provided with a slot 65 through which the drive dogs 29 move laterally into engagement with the chain, the width of this slot being limited so that the surfaces at either side thereof can engage the chain to strip it from the dogs as they move out of engagement. At the entrance side of the first section, an upwardly flared portion 66 (Fig. 1) is provided on the bottom member 64, and an inwardly flared vertical surface 67 is provided to guide the chain into the channel.

The second, or slack section of the chain channel, shown in Fig. 4, is formed by a continuation of the angle member 61, a continuation of the bottom plate 64, and by a second angle member 68 having a vertical flange 69 forming a continuation of the barrier member 63. The bottom plate 64 is connected to the vertical flanges 69 and 62 of the two angle members. This second section is not shown in its full length, since its construction is the same throughout. It extends from the discharge side of the auxiliary drive unit a distance at least sufficient to accommodate all the normal excess length, or slack, of the conveyor chain through telescoping action between the links thereof, plus a further distance to allow for the gradual increase in slack from wear and stretch.

The auxiliary driving unit is not intended to augment the main driving unit, or share any part of the load normally borne thereby. Its function is only to place the chain at the discharge side of the main unit under sufficient tension to cause proper disengagement between the conveyor chain and the driving dogs 12 of the main unit. Consequently the auxiliary drive unit can be made much smaller and lighter in construction than the main unit. Its drive dogs 29 are much thinner in cross-section than are the drive dogs 12 of the main unit. The dogs 29 thus engage a much smaller area of the chain, an area on the rounded end surface of a chain center link. Furthermore, the chain is positively positioned vertically with respect to the drive dogs 29 of the auxiliary unit through the action of the bottom plate 64 of the first section of the chain channel and through the tracks 18 which define the vertical position of the trolleys supporting the chain. With the vertical position of the conveyor chain so established, the auxiliary drive unit is located vertically so that its drive dogs 29 engage the chain in clearance relationship with the side bars thereof so that contact between the drive dogs and the chain is limited to the end surface of a center link as previously mentioned. Consequently, the amount of frictional engagement between the drive dogs of the auxiliary unit and the conveyor chain is materially reduced both as a result of loading on the drive dogs and of lesser contact area between drive dogs and the chain. This reduces frictional engagement between the chain and the barrier member 63 accompanying disengagement between the drive dogs and chain, and allows the chain to be smoothly advanced by the auxiliary unit into the slack section of the chain channel.

In the slack section, the vertical surfaces 62 and 69 of the chain channel confine the chain elements to a longitudinally aligned position. Additionally, the bottom plate 64 prevents any excessive sag in the slack chain between a pair of trolleys which support the chain vertically. Thus the slack section not only holds the chain in assembled relationship, but also holds it in a correct straight line position so that no undue strains are placed upon the chain elements when they are again subjected to load.

Means have been included in the construction shown for protecting the auxiliary unit from overload. This consists in an idler sprocket 70 carried on a pivotally mounted bracket construction generally designated by the reference 71, and engaging the tension run 60 of the chain 59 which drives the auxiliary unit.

The bracket 71 is composed of a pair of arms 72 and 73 connected in angular relationship at 74, the arm 72 being of rectangular cross-section and the arm 73 being of angle section. A brace 75 additionally interconnects the arms. The bracket is pivotally mounted as shown in Fig. 6 upon a connecting pin 76 secured to a mounting plate 77 and engaging a sleeve construction 78 provided on the arm 72. The mounting plate 77 is secured to a suitable frame member 79.

Fig. 1 shows the bracket 71 in what may be termed its normal position of movement about the pivot pin 76. This position is defined by a stop formed by an angle section 80 carried by the frame cross member 55 and mounted so that its vertical flange is engaged by the vertical flange of the arm 73 of the bracket, with the horizontal flange of the arm 73 overlying the horizontal flange 81 of the stop member. Normal position of the arm 71 is maintained by a spring 82 carried on a bolt 83 provided with nuts 84 which engage the vertical flange of the stop member 80. A limit switch 85 is also secured to the stop member by bolts 86, this limit switch having an actuating arm 87 which extends in overlapping relationship with the end of the arm 73 of the bracket 71.

If the load on the auxiliary driving unit increases, the increased tension in driving chain 59 will tend to straighten the driving run 60 thereof, producing a clockwise movement of the bracket 71 about its pivot 76. This clockwise movement is opposed by the spring 82 to an extent depending upon its strength and the amount of preloading set by the nuts 84. Thus sufficient increase in tension in the chain 59 will result in sufficient movement of the bracket 71 to actuate the limit switch 85. This switch is electrically connected so that such actuation results in stopping the motor which drives the main and auxiliary units. Adjustments necessary to remove a cause of overload can include a re-spacing of the drive dogs 29 of the auxiliary unit with relation to the drive dogs 12 of the main unit, obtained by adjusting the drive sprocket 26 of the auxiliary unit in its arcuate slots 36, or a removal of excess slack from the conveyor chain 10. The effect of such excess slack is to increase the load on the auxiliary unit by increasing the amount of conveyor chain and associated loaded carriers it is required to push down the slack section of the chain channel.

The principles of operation of the auxiliary unit of Figs. 1 to 6 have been carried forward into the construction of the main driving unit shown in Figs. 7 to 17. Referring to Fig. 7, the drive unit there illustrated is a floating frame caterpillar type. It is designed to propel conventional conveyor chain of a subfloor drive line for floor trucks. The construction of the unit follows conventional practice except for certain modifications which permit the unit to operate in conjunction with a chain channel similar to that previously described and having chain positioning and slack sections.

The drive unit generally includes driving machinery, such as a motor 90 and reducer 91 (Fig. 8), which are mounted in a floating framework of suitable longitudinal members 92 and transverse members 93. Longitudinal members 92 are provided with V ways 89 which engage grooved rollers 94 carried by adjacent longitudinally disposed fixed frame members 95 (Fig. 9). Longitudinal frame members 95 are connected at their ends to transverse channel section frame members 88 to form a rectangular fixed framework which supports the floating frame. Reaction springs 97 are interposed between the longitudinal or side members 95 and 92 of the stationary and movable frameworks, respectively, and oppose the tendency for the floating frame to move backward along the conveyor chain as a result of the driving reaction. Such a floating frame construction is commonly employed as a means of sensing overload on the drive, and as a means of speed control where more than one drive unit is used to propel a single conveyor chain.

The stationary framework is supported from a pair of main beams 104 which span the length of the pit within which the drive unit is located, the ends of this pit being indicated by the phantom lines 111 in Figs. 7 and 8. A pair of short vertical members 96 are secured to each of the transverse members 88 of the framework, adjacent each corner thereof and in vertical alignment with the beams 104, and a track clamp type of connection 150 is employed to join the members 96 to the beams (Figs. 7 and 8) so that the fixed frame structure is supported from the beams at four points, and can be adjusted along the length of the beams, if necessary.

A roller chain 98 is employed as a driving member. It is trained about a driving sprocket 99 secured to the output shaft 100 of the reducer 91, and about a tensioning sprocket 101 mounted on an axle 102 which is carried by structure, generally designated by the reference 103, permitting the center-to-center distance between the axle 102 and reducer output shaft 100 to be varied. The path of travel of the drive chain 98 on its driving run is defined by a back-up bar 105 which is secured to a member 106 of the floating frame by bolts 107 and adjusting nuts 108. This back-up bar 105 is engaged by rollers 109 of the drive chain 98. Drive dogs 110 are secured to the chain 98 between an adjacent pair of rollers thereon, and hence the back-up bar 105 determines the motion of the drive dogs 110 as they advance into and out of engagement with the conveyor chain.

The path of travel of the conveyor chain is determined by a chain channel which again may be conveniently considered as comprising a positioning section which extends from a point in advance of the area where the conveyor chain is engaged by the driving dogs to a point immediately following such area. The slack chain section begins at the end of the driving area so that the conveyor chain is discharged by the driving unit into the slack chain section. The construction of the chain channel appears in plan in Fig. 7, in longitudinal sectional elevation in Figs. 10 and 11, and in cross-sectional elevation in Figs. 12, 13 and 14.

Referring to these views, the positioning section of the chain channel begins at the edge of the drive pit indicated by the phantom line 111 at the left side of Fig. 7. Its construction at this point comprises (Fig. 14) a pair of angle members 113 and 114, each mounted with a horizontally disposed flange 115 secured to the lower flange 116 of channel section track members 117 which support the conveyor trolleys. The vertical flanges 118 of each of the angles 113 and 114 are formed with flared ends 119 to guide the chain, which is traveling in the direction of the arrow 120, into the channel. A bottom plate 121, also having a flared end 122, is attached between the lower ends of the vertical flanges 118 of the angle members 113 and 114.

Angle member 113 terminates just short of the working area of the drive chain 98, allowance being made for the floating movement thereof. At this point the wall of the chain channel is continued by a barrier member (Fig. 10) composed of a pair of bars 125 secured together in spaced relation by plates 123 to form a slot 124. The width of this slot permits passage of the drive dogs 110 therethrough but is limited so that the surfaces bordering the edges of the slot are adjacent the sides of the chain components (see Fig. 13).

Fig. 11 shows the construction of the opposite side of the chain channel along the working area of the drive chain 98. The side angle member 114 is terminated at a point 126 just following the beginning of the barrier member previously described, and a roller section is inserted to form a continuation of the side wall and to act to reduce the friction between the conveyor chain and the chain channel during the time the chain is in driver engagement with the dogs 110 of the drive unit. The construction of this roller section is also shown in Fig. 13 and comprises upper and lower horizontal plates 127 and 128, the bottom plate 128 forming a continuation of the bottom member 121. These plates 127 and 128 are connected by a vertical plate 129, and a series of rollers 130 are rotatably mounted between the plates 127 and 128. This roller section is assembled to the chain channel structure so that the peripheries 131 of the rollers 130 are positioned to act as continuations of the vertical surface formed by the vertical flange 118 of angle member 114, the upper plate 127 of the roller section being secured to the lower flange 116 of the track member 117 as shown in Fig. 13.

Following the barrier member and the roller section, the construction of the chain channel, which has now progressed to the slack section thereof, is similar to the initial portion of the positioning section. A sectional view of this construction is shown in Fig. 12. As the parts are viewed in this figure, the right-hand side of the channel is formed by an angle member 133 which extends from the end of the roller section, along with a bottom plate 134. The left-hand side is formed by an angle member 135 which extends from the end of the barrier member, the two angle members 133 and 135 being secured to the lower flanges of their respective track members, and being connected to the plate 134.

The length of the slack chain channel is indefinite. From a theoretical standpoint it needs only to have a length slightly in excess of that required to accommodate the slack of one center link and pair of side bars of the conveyor chain, since this length of chain can be removed at any time the amount of slack becomes an excess thereof. Practically, however, it cannot be assumed that the conveyor will be checked frequently enough and shut down for the removal of slack, and therefore a greater length of the slack section of the chain channel should be provided. In some installations, it may even be desirable to extend the chain around the entire path of travel of the conveyor in order to insure the chain being kept in assembled relationship regardless of where slack should appear. This is considered the better practice, for in an installation of this type where no means are provided for confining slack to one area, as does a take-up device, there is no guarantee that slack will always accumulate immediately at the discharge side of the drive unit. Other factors, such as the inertia of loaded carriers, inclines in the system, etc., may create conditions where slack would be drawn from the section immediately following the discharge side of the drive unit and appear at some other place along the path of travel of the chain. This is one reason why the invention has particular utility in the subfloor drive line type of installation shown, since a chain channel has conventionally been included in the subfloor track structure all along the path of travel except in pits where drive and take-up units have been installed.

The means for transmitting the reaction between the chain and the positioning means comprise a roller section carried by the floating frame of the drive unit, and which is shown in Figs. 7, 9 and 13. This roller section comprises a number of rollers 143 rotatably carried between a pair of vertically spaced longitudinally extending angle members 144 which in turn are each secured to a pair of vertically extending angle section posts 145. These posts are rigidly secured to one of the cross members 93 of the floating frame of the drive unit. The rollers 143 are positioned to bear against the vertical member 129 of the roller section of the chain channel and can roll along this member in the event of movement of the drive floating frame, always opposing any tendency of the drive unit to be forced laterally away from the path of travel of the chain from the lateral driving reaction between the drive dogs and chain.

The path of travel of the drive chain 98 on its driving run, as defined by the back-up bar 105, includes an approach portion 147 on a line tangent to the tensioning sprocket 101 and extending laterally toward the path of travel of the conveyor chain; a driving portion 148 extending parallel to the path of travel of the conveyor chain and gradually changing direction to a retracting portion 149 which extends on a line tangent to the drive sprocket 99. In conventional practice, the pitch of conveyor chain is slightly in excess of the spacing between dogs of a drive unit, so that with tension on the chain at the discharge side of the drive unit, a natural clearance between chain and drive dogs exists which aids in disengaging each dog from the chain. Since no tension is employed on the conveyor chain in the present construction, other means must be relied upon for relieving the frictional engagement between the chain and a retracting dog. This means must counteract the tendency for the spacing between drive dogs to increase as the path of travel of a leading dog changes from the driving portion to the retracting portion of the driving run of the sprocket chain.

Each of the drive dogs 110 include a driving face 150 (Fig. 15) that has been formed with certain curvature. The retracting path 149 of the drive chain 98, extends at an angle and the back-up bar is formed with a certain curvature 151 in the transition region where the path of the drive chain changes from the parallel driving portion 148 to the diverging, retracting portion 149. The curvature of the driving face 150 equals or exceeds the curvature 151 of the back-up bar.

If this relationship is maintained, the distance between the driving face 150 of a dog 110A traveling along the retracting portion 149 of the back-up bar will never increase relative to the driving face of a following dog 110B traveling along the driving portion 148 thereof. Instead, the driving face 150 of the dog 110A traveling on the retracting portion will move laterally. Preferably, the curvature of the driving face 150 of the driving dog exceeds the curvature 151 of the back-up bar so that the distance between the driving face of the retracting dog 110A and the driving face of a following dog 110B actually decreases, thus transferring all load away from the retracting dog. Such excess curvature of the driving face 150 is shown in Fig. 15, and it can be seen that while the retracting dog 110A still contacts the conveyor chain, telescoping action of the chain has already begun, and the load has been transferred to the following dog 110B.

Fig. 18 shows an alternate construction for accomplishing proper, controlled, disengagement between the driving dogs and the conveyor chain, which has not been included in detail in this view, as the relationship between the chain components and the driving dogs can be visualized from a comparison with Fig. 15. Each of the drive dogs 160 has a driving face 161 formed at an angle 162 to the base 163 of the dog. The back-up bar 165 is made with a relatively long, straight face 166, and is secured to its mounting studs 167 at an angle so that the straight face 166 of the bar can be positioned at an angle of divergence with the path 168 of the conveyor chain, traveling in the direction 169.

The angle of divergence defined by the back-up bar is equal to or less than the face angle 162 of the driving dogs 160. If this relationship is maintained, the driving face 161 of each dog 160 moves laterally, or laterally and rearwardly, away from engagement with the conveyor chain 168 as the dogs travel along the straight section 166 of the back-up bar, which defines a tangential line of approach for the drive chain 170 to the sprocket 171.

Location of the area where the drive chain 170 changes direction to the tangential line of approach is made to correspond with the area where each dog moves into driving engagement with the conveyor chain. Motion of each dog is momentarily accelerated as the drive chain moves through this area of changing direction, and the arrangement results in this accelerating condition occurring, with respect to the conveyor chain, only during movement of each dog into initial engagement therewith. Thereafter, each dog engages the chain while moving along a path of drive chain travel which is substantially tangent to the downstream sprocket 171. A leading dog cannot accelerate to take the load away from a following dog, and thereby create such frictional engagement with the conveyor chain as would prevent easy stripping action by the stripper bars 125.

Working dimensions encountered in the conveyor practice are subject to some tolerance, and thus ideal conditions are not always fulfilled. With the incorporation of the constructional features just described, however, it has been found that the load on a retracting dog can be reduced to the point where the barrier member of the chain channel can satisfactorily overcome all friction between a retracting dog and the chain, stripping the chain from the dog without undue wear on any of the parts. It thus becomes possible to completely eliminate a take-up or tensioning device as a means for assisting in the disengagement between a conveyor chain and the means for driving it.

We claim:

1. A drive line construction for propelling wheeled floor supported trucks in a path defined by a guide slot and including a trolley track positioned below said guide slot, trolleys mounted on said track with at least some of said trolleys having a driving member for engaging a drive pin carried by a truck when lowered through said guide slot, an endless chain suspended from said trolleys below the track, said chain being of the type composed of alternate center links and pairs of side bars connected for articulating longitudinally telescoping movement by headed pins and held in assembled relation as a function of the relative position between said links, side bars and pins, and a chain drive unit having driving members which move in a horizontal plane and engage the chain from one side of the path of chain travel by entering between said side bars and contacting said chain links, characterized by the improvement of providing a fixed length for the path of drive line travel defined by the guide slot and trolley track, and including means extending from a location in advance of the drive unit to a location beyond the discharge side thereof for positively positioning said chain horizontally and vertically relative to the driving members of the drive unit, said positioning means comprising a barrier member extending between said locations along one side of the path of chain travel and mounted between the chain and the driving unit, said barrier member having a slotted aperture for the passage of said driving members through said barrier member into and out of driving engagement with said chain links, the width of said aperture being such that a portion of said barrier member on either side of the aperture can contact said chain and limit movement thereof toward the driving unit, a chain positioning member extending parallel to said barrier member between said locations along the other side of the path of chain travel, and a bottom plate extending between said locations below the path of chain travel, said bottom plate being adapted to align said chain vertically for engagement by driving members moving through said aperture.

2. A drive line construction according to claim 1 wherein the drive unit is mounted below the level of the floor and track in a pit, and further characterized by the means for positioning the chain relative to the driving members thereof being supported from a pair of main beams spanning the pit on either side of the path of chain travel, and structure interconnecting said main beams and chain positioning means below the path of chain travel whereby any force imposed upon said chain positioning means will be transmitted to one of said main beams and will be accompanied by a reaction upon the other of said main beams.

3. A drive unit construction as set forth in claim 1 wherein said drive unit is of the type having the driving members carried by an endless member which is supported and propelled in a generally oval path including a driving run and a return run, and where back-up means are provided to define portions of the driving run which approach, parallel and diverge from the path of chain travel, each driving member being projected through said slot and into engagement with said chain on the approach portion of the driving run and withdrawn from such slot and out of engagement with said chain on the diverging portion, said parallel and diverging portions being connected by a curved section, and wherein the driving face of each of said driving members is formed with a convex curvature on a radius not exceeding the radius of said curved section.

4. A conveyor construction according to claim 1 wherein the chain drive unit includes a framework mounted for movement relative to the chain positioning means along the path of travel of the chain and further characterized by said positioning structure and the said framework each including a set of antifriction rollers, the rollers of said positioning structure being adapted to contact said conveyor chain, and the rollers of said framework being adapted to contact said positioning structure.

5. A conveyor construction according to claim 4 wherein said positioning structure includes a plate member adapted to be contacted by the rollers of said framework.

6. A conveyor construction according to claim 1 wherein the said chain driving device comprises an auxiliary chain propelling unit mounted to engage the chain at a location on the discharge side of a main chain driving unit, and further including means for driving said auxiliary chain driving device in synchronism with said main driving unit.

7. A conveyor construction according to claim 6 wherein the said means for driving said chain driving unit includes a driven member carried by said driving unit, a driving member carried by said main driving unit, an endless propelling member trained about said driving and driven members, a tensioning member engaging the tension run of said propelling member, means supporting said tensioning member for movement laterally of said endless propelling member, and means responsive to lateral movement of said tensioning member for stopping said main drive unit.

8. A conveyor construction according to claim 6 wherein said chain driving unit is an auxiliary unit for use in conjunction with a main chain driving unit and comprises an endless chain propelling member on which said driving members are mounted in laterally projecting relation therewith, means for supporting and propelling said driving member in a generally oval path including a chain driving run and a return run, means for driving said chain driving unit in synchronism with said main driving unit, and means for sensing the load on said driving device and for stopping said main driving unit in the event such load increases beyond the predetermined amount.

9. A conveyor construction according to claim 8 wherein the means for driving the chain driving unit in synchronism with the main driving unit includes an endless member driven by said main drive unit and drivingly engaging a driven member forming part of said auxiliary driving unit, a tensioning sprocket engaging the tension run of said endless member, means mounting said sprocket for lateral movement relative to said endless member, means normally urging said sprocket into engagement with said endless member, and means responsive to lateral movement of said sprocket in a direction of disengagement with said endless member for stopping said main drive unit.

References Cited in the file of this patent
UNITED STATES PATENTS

| | | |
|---|---|---|
| 2,193,076 | Preble | Mar. 12, 1940 |
| 2,371,624 | Hudson | Mar. 20, 1945 |
| 2,530,786 | Rose | Nov. 21, 1950 |
| 2,609,085 | Terhune | Sept. 2, 1952 |
| 2,628,702 | Mabrey | Feb. 17, 1953 |
| 2,642,176 | Burgh | June 16, 1953 |

FOREIGN PATENTS

| | | |
|---|---|---|
| 634,903 | Great Britain | Mar. 29, 1950 |
| 800,165 | Germany | Sept. 25, 1950 |